United States Patent [19]

Lederer

[11] 4,273,910

[45] Jun. 16, 1981

[54] COLD HARDENING BINDING AGENT FOR PARTICULATE SOLIDS, SUCH AS MOLDING SAND, CONTAINING A NITROGEN BASIC POLYOL

[75] Inventor: Gernot Lederer, Speyer, Fed. Rep. of Germany

[73] Assignee: Woellner-Werke, Rhein, Fed. Rep. of Germany

[21] Appl. No.: 131,782

[22] Filed: Mar. 19, 1980

Related U.S. Application Data

[63] Continuation-in-part of Ser. No. 100,438, Dec. 5, 1979, abandoned.

[51] Int. Cl.³ .............................................. C08G 18/38
[52] U.S. Cl. ...................................... 528/48; 528/57; 528/77; 528/78
[58] Field of Search ...................... 528/48, 57, 77, 78; 260/DIG. 40

[56] References Cited

U.S. PATENT DOCUMENTS

| | | | |
|---|---|---|---|
| 3,288,732 | 11/1966 | Chapman et al. | 521/131 |
| 3,686,106 | 8/1972 | Tideswell et al. | 528/77 |
| 3,933,727 | 1/1976 | Schmid | 260/DIG. 40 |
| 4,124,556 | 11/1978 | Schafer et al. | 260/DIG. 40 |

*Primary Examiner*—Maurice J. Welsh
*Attorney, Agent, or Firm*—Browdy & Neimark

[57] ABSTRACT

A cold hardening binding agent for binding particulate solid materials is based on a mixture of a polyhydroxy compound and a polyisocyanate, and the polyhydroxy compound consists at least in part of a nitrogen basic polyol. The nitrogen basic polyol accelerates reaction and hardening time. An alkali or alkaline earth metal acetate or formate may also be employed to accelerate hardening.

12 Claims, No Drawings

COLD HARDENING BINDING AGENT FOR PARTICULATE SOLIDS, SUCH AS MOLDING SAND, CONTAINING A NITROGEN BASIC POLYOL

This is a CIP of copending application Ser. No. 100,438 filed Dec. 5, 1979, now abandoned, the contents of which are hereby incorporated by reference.

Cold hardening binding agents for particulate solids, in particular for molding sand, are already known. For example, mixtures of polyhydroxy compounds and polyisocyanates are employed as such binding agents (DE-OS No. 24 40 375), wherein, however, hardening must be effected by blowing into the mixture gaseous and volatile tertiary amines, preferably triethylamine and diethylamine.

Binding agent mixtures of polyisocyanates and phenolformaldehyde or "Novolak"-resins are hardened with the same hardening agents (DE-AS No. 1 582 521).

De-OS No. 19 20 750 describes the addition of less volatile amines or basic-reacting heterocyclic nitrogen compounds as hardening agents for binding agent mixtures of the nature described above.

A disadvantage of all these known self-hardening binding agents for molding sand is that in the production of molded forms and cores of molding sand, it is necessary to employ a third hardening agent component. It is not possible to combine the hardening agent component with either of the two components of the binding agent. As a result, it is necessary to provide a three-package system to the user. Furthermore, the hardening agent component in these systems are unpleasant smelling and toxic substances, which affect the physiological conditions of the working area in an imaginable fashion.

Additionally, employment of the above described systems leads to a high degree of graphite formation at the interface between the molded form surface and molten metal which hinders to a large extent an efficient adhesion of such substances as lacquers or enamels to the surface of molded articles.

Furthermore, the thermo-stability of molding mixtures employing known binding agents for producing of molded forms and cores is unsatisfactory insofar as, because of a certain degree of thermoplasticity of these forms and cores, the casting procedure often affects the dimensional stability of the castings adversely.

It is accordingly an object of the present invention to provide a cold hardening binding agent for particulate solids, in particular molding sand, which does not possess the disadvantages outlined above.

This object is solved by a cold hardening binding agent for binding particulate solid materials which is based on a mixture of a polyhydroxy compound and a polyisocyanate, characterized in that the polyhydroxy compound consists at least in part of a nitrogen basic polyol.

The polyols employed in the binding agent of the present invention are known and are on the market. It is accordingly not necessary to describe their production in detail. They can be produced from ethylene diamine and its oligomers, such as diethylene triamine, triethylene tetramine or tetraethylene pentamine, or propylene diamine and its oligomers, for example dipropylene triamine, tripropylene tetramine etc., or nitrilo triethylene diamine. The amines mentioned are converted in known manner one or more times with ethylene oxide, propylene oxide or 1,2-butylene oxide. Preferably, in accordance with the invention, the reaction product of 1 mol of ethylenediamine and 5,7 or 9 mol of propylene oxide, is employed.

Preferably, the polyols employed in accordance with the invention possess a hydroxy number of from 100 to 1800, in particular 200 to 800. The hydroxy number is expressed in mg of KOH per g of substance.

Preferably, the nitrogen basic polyol is di- to pentafunctional; mixtures of different nitrogen basic polyols with different functionalities can be employed.

The polyisocyanate employed in the invention can be any known polyisocyanate having at least two isocyanate groups. Suitable for example are pre-polymers, produced by partial conversion of toluylene di-isocyanate and glycols, such as ethylene glycol, aliphatic isocyanates, such as hexamethylene di-isocyanate, alicyclic polyisocyanates, such as 4,4-dicyclohexyl methane di-isocyanate, aromatic polyisocyanates, such as 3,4- and 2,6-toluene di-isocyanate, diphenyl methane di-isocyanate, naphthaline-1,5-di-isocyanate, triphenyl methane tri-isocyanate, xylene di-isocyanate or methyl derivatives thereof, polymethylene polyphenyl isocyanate and methyl derivatives thereof, or chlorophenylene-2,4-di-isocyanate.

Particularly suitable is diphenyl methane di-isocyanate, which may be employed in pure form of in raw form.

The polyisocyanates which may be employed in the invention are, as with the defined polyols, available on the market under various trademark names.

The mole ratio of the polyisocyanates to the polyols is 1:1, since it is important that all isocyanate groups be blocked or bound by chemical reaction with the polyols.

In accordance with a further preferred embodiment of the invention, the nitrogen basic polyol is employed in admixture with a preferably di- to penta-functional nitrogen free polyol. Mixtures of different nitrogen basic polyols with different nitrogen free polyols can also be employed.

The invention is concerned with the surprising finding that of the known polyhydroxy compounds known for reaction with polyisocyanates, use of the nitrogen basic polyols as a component of cold hardening binding agents for particulate solids, in particulate molding sand, leads to a quick reaction without the need for a catalyst. In the case of the known use of nitrogen free polyols, as already described, it is necessary to introduce a gaseous and volatile tertiary amine as catalyst.

In that higher functional nitrogen basic polyols react in known manner more quickly than lower functional polyols, formulations can be made up dependently of the desired use of the cold hardening binding agents, by selecting the appropriate functionality of these compounds. A further variation which is possible consists in additionally employing the nitrogen free polyols, which in contrast to the "quick reacting" nitrogen basic polyols can be described as "slow reacting" polyols. This enables admixtures which, dependently of the amount of nitrogen free polyols, will lead to a correspondingly lower hardening of the binding agent.

The invention is further concerned with the additional finding that the rate of hardening can be further increased, although this is sufficient, by the addition of new catalysts, which consist of alkali or alkaline earth metal acetates or formates. Particularly suitable is potassium acetate, but sodium acetate or calcium acetate or the formates of such metals can also be employed with advantage. For example potassium acetate is employed in a glycol such as ethylene glycol, triethylene glycol, ethylene diglycol or propylene diglycol. Furthermore, the potassium acetate can be dissolved in glycerine. Diethylene glycol is employed most advantageously. Calcium acetate can be dissolved in ethylene glycol to provide a 10% solution; sodium acetate is similar. The solutions of these catalytic reacting acetates and formates are added to the polyol components, so that binding agents in accordance with the invention, also when employing a catalyst, are formulated in a two-component system. All known systems of the nature described above need to be provided in three separate packages. The acetates and formates are preferably included in the binding agent in amounts of from 0.1 to 10% by weight, preferably 0.2 to 5% by weight, based on the binding agent.

The alkali or alkaline earth metal acetates and formates which can be employed as catalysts in accordance with the invention, possess such a strong catalytic action that it is even possible to catalyze the reaction of the polyisocyanates with nitrogen free polyols. It is thus possible to replace a major proportion or even replace completely the nitrogen basic polyol by one or more nitrogen free polyols.

The addition of the above described catalysts render it possible to provide a further variation for adjusting the rate of hardening of the binding agents of the present invention. Additional to the described possibility of combining a "slow reacting" polyol (nitrogen free polyol) with a quick reacting polyol (nitrogen bais polyol), wherein the latter accelerates the reaction of the former with the polyisocyanate, the addition of a catalyst can also accelerate the reaction of a "slow reacting" polyol. Also a three component system, consisting of a "slow reacting" polyol, a "quick reacting" polyol and an alkali or alkaline earth metal acetate or formate as catalyst is possible. By the appropriate choice from these possibilities, in which the functionalities should be considered, it is possible to produce cold hardening binding agents for any desired use, and the rate of hardening can be varied from 1 minute up to 2 hours.

Preferably, the mean molecular weights of the polyols employed (independently of reactivity) are between 290 and 620.

The preparation of the nitrogen free polyols is known. They can be produced by reaction of diols, triols, tetrols or sugar-like polyhydroxy compounds with 1,2-alkylene oxides, in the presence of a basic catalyst such as sodium hydroxide or potassium hydroxide, with or without pressure being applied.

As a result of the present invention, a cold hardening binding agent for particulate solids, in particular molding sand, as a two-component system, without catalyst, can be supplied to the user, in contrast to the systems known up until now which absolutely required a hardening agent. This is also the case when optionally an alkali or alkaline earth metal acetate or formate, such as potassium acetate is employed as hardening agent, since this catalytic component can be admixed with the polyol component. Additionally the alkali or alkaline earth metal acetates and formates are odorless and non-toxic substances which do not lead to physiological disadvantages in the area of work.

For the purpose of improving the adhesion between the binding agent and the particulate material, such as quartz sand, zircon sand, olivine sand etc. which is to employed in producing the molded forms and cores, an amount of an organo-functional silane, preferably from 0.05 to 1% by weight, based on the binding agent, can be admixed.

Suitable silane compounds are for example γ-aminopropyl-treithoxy silane, γ-methacryl-oxypropyl-trimethoxy silane, and γ-glycidyl-oxypropyl-trimethoxy silane.

Sometimes the uniform distribution of the binding agent on the particulate solids, such as quartz sand, is facilitated by an organic solvent, which lowers the viscosity of the binding agent. Suitable solents are for example aromatic solvents such as toluene, xylene, ethylbenzene or naphthalene, also solvents of the ether and ester types, such as diglycoldimethyl ether, methylene diglycol, ethylene diglycol, ethyl glycol acetate, glycerine and glycerine ester, technical mixtures of ethylene glycol acetates, furfuryl alcohol or diacetone alcohol. Furthermore, for the purpose of reducing viscosity, a polyol based on polypropylene glycol having a hydroxy number of from 235 to 265, a mean molecular weight of 450, a viscosity of 50 mPa.s, a density of 1.01 g/cm$^3$, a setting point of $-38°$ C. and an acid number of 0.01, can be employed.

In the production of a molding sand mixture, for example dried quartz sand is mixed with an amount of the binding agent which is less than 6% by weight, and particularly from 0.3 to 3% by weight, calculated on the total mixture. The mixture can also comprise other ingredients such as iron oxide, coke flour, saw dust, pitch, bitumen, fire-clay and/or other fire-resistant materials in finely divided form.

The molding composition obtained is then made into the desired form and densified in accordance with known procedure. The hardening takes place upon standing at room temperature, whereby the rate of hardening can be modified by appropriate choice of the individual components, optionally by addition of an alkaline acetate or formate as hardening catalyst.

The molded articles obtained when employing the binding agents of the present invention possess a good surface condition enabling application of varnish and enamel coatings.

The following examples are illustrative of the invention. All proportions are proportions by weight and all percentages are percentages by weight, where other information is not provided.

EXAMPLE 1

Hardening solution 53.8% aliphatic, higher functional, nitrogen-free polyol having a hydroxy number of from 380 to 420, a viscosity at 25° C. of 5000 mPa. s, a density of 1.09 g/cm$^3$, a setting point of $-6°$ C., and an acid number of 0.006 (mgKOH/g) (Polyol I)

23.1% nitrogen basic, aliphatic, tetra-functional, highly reactive polyol (hydroxy number 460 to 500, viscosity at 25° C. of 4100 mPa. s, density of 1.02 g/cm$^3$, setting point $-12°$ C.) (Polyol II)

23.1% technical solvent mixture of ethylene glycol acetates, boiling point range 185° C. to 195° C.

Molding mixture 100.00% of quartz sand H32
0.7% above hardening solution 0.7% diphenyl methane di-isocyanate, raw technical grade Hardening time, for removal from the mold: 18 to 20 minutes.

EXAMPLE 2

Hardening solution

40% Polyol I
40% Polyol II
20% methyl diglycol

Molding mixture 100.0% quartz sand H32
0.9% above hardening solution
0.9% diphenyl methane di-isocyanate, raw technical grade Hardening time, for removal from the mold: ca. 5 minutes

EXAMPLE 3

Hardening solution 90.0% Polyol I
10.0% of a 25% potassium acetate solution in ethylene diglycol

Molding mixture 100.0% quartz sand H32
1.0% of above hardening solution
1.0% diphenyl methane di-isocyanate, raw technical grade Hardening time, for removal from the mold: ca. 6 to 9 minutes.

EXAMPLE 4

Hardening solution 39.8% Polyol I
39.8% Polyol II
20.0% ethylene diglycol
0.4% potassium acetate

Molding mixture 100.0% quartz sand H32
0.9% of above hardening solution
0.9% diphenyl methane di-isocyanate, raw technical grade Hardening time, for removal from the mold: ca. 9 to 11 minutes.

EXAMPLE 5

Hardening component 81.0% by weight of a nitrogen-free trifunctional and highly branched hydroxyl group-containing solvent-free polyether on the basis of glycerin having an OH-number of from 380 to 420, a viscosity of appr. 400 mPa . s at 25° C., a density of 1.05 g/cm³, a pour point of −21° C. and an acid number of 0.004 mg KOH/g (polyol III),
10.0% by weight of a technical solvent mixture of aromatics having boiling ranges from 160° to 260° C.,
9.0% by weight of a 25% potassium acetate solution in diethylene glycol.

Molding Mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sane temperature prior to blending at room temperature was 23° C.

The hardening time until removal from the mold was 15 minutes.

When the above-mentioned mixture is used without potassium acetate, the hardening time up to removal from the mold amounts to 2 hours and 30 minutes.

This example demonstrates the acceleration of a "slow" nitrogen-free polyol by potassium acetate.

EXAMPLE 6

Hardening component 80.0% by weight of polyol III according to Example 5,
8.7% by weight of solvent mixture according to Example 5,
11.3% by weight of a 20% potassium formate solution in diethylene glycol.

Molding Mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time up to removal from the mold was 13 minutes.

When the above-mentioned mixture is used without potassium formate, the hardening time until removal from the mold amounts to 3 hours.

This example also demonstrates the acceleration of a "slow" nitrogen-free polyol by potassium formate.

EXAMPLE 7

Hardening component 76.0% by weight of polyol III according to Example 5,
6.0% by weight of solvent mixture according to Example 5,
18.0% by weight of a 12.5% sodium formate solutin in ethylene glycol.

Molding mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time until removal from the mold was 14 minutes.

When the above-mentioned mixture is used without sodium formate, the hardening time until removal from the mold amounts to 2 hours and 56 minutes.

This example also shows the acceleration of a "slow" nitrogen-free polyol by sodium formate.

EXAMPLE 8

Hardening component 78.0% by weight of the polyol III according to Example 5,
10.0% by weight of the solvent mixture according to Example 5,
12.0% by weight of a 33% potassium acetate solution in diethylene glycol.

Molding mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time until removal from the mold was 4 minutes.

When the above-mentioned mixture is used without potassium acetate, the hardening time until removal from the mold amounts to 2 hours and 58 minutes.

This example demonstrates the rapid hardening by potassium acetate of a nitrogen-free polyol that otherwise is slow to react.

EXAMPLE 9

Hardening component 41.0% by weight of the polyol III according to Example 5,
41.0% by weight of a nitrogen basic aliphatic tetrafunctional highly reactive polyol with an OH-number of from 460 to 500, a viscosity of 4100 mPa . s at 25° C., a density of 1.02 g/cm³ and a setting point of −12° C. (polyol IV) 11.0% by weight of the solvent mixture according to Example 5, 7.0% by weight of a 25% potassium acetate solution in diethylene glycol.

Molding mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time until removal from the mold was 8 minutes.

When the above-mentioned mixture is used without potassium acetate, the hardening time until removal from the mold amounts to 18 minutes.

This example demonstrates an increased acceleration effect by utilization of potassium acetate in a combination of a "slow" nitrogen-free polyol with a "rapid" nitrogen basic polyol.

EXAMPLE 10

Hardening component 41.0% by weight of the polyol III according to Example 5,
41.0% by weight of the polyol IV according to Example 9,
11.0% by weight of the solvent mixture according to Example 5,
7.0% by weight of a 25% potassium formate solution in ethylene glycol.

Molding mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time until removal from the mold amounts to 7 minutes.

When the above-mentioned mixture is used without potassium formate, the hardening time until removal from the mold amounts to 16 minutes.

This example demonstrates an increased acceleration effect by utilization of potassium formate in a combination of a "slow" nitrogen-free polyol with a "rapid" nitrogen basic polyol.

EXAMPLE 11

Hardening component 44.0% by weight of the polyol III according to Example 5,
33.0% by weight of an aliphatic tetrafunctional highly reactive polyol having an OH-number of from 760 to 775, a viscosity of 30000 mPa . s at 25° C., a density of 1.03 g/cm³ and a setting point of +20° C. (polyol V),
15.0% by weight of the solvent mixture according to Example 5,
8.0% by weight of a 25% potassium acetate solution in diethylene glycol.

Molding mixture

100% by weight of quartz sand H 32
0.6% by weight of the above hardening component
0.6% by weight of the isocyanate component consisting of 90% by weight of 4,4'-diphenyl methane diisocyanate (raw, technical grade) and of 10% by weight of a technical solvent mixture of aromatics having boiling ranges from 160° to 260° C.

The sand temperature prior to blending at room temperature was 23° C.

The hardening time until removal from the mold was 5 minutes.

When the above-mentioned mixture is used without potassium acetate, the hardening time until removal from the mold amounts to 18 minutes.

This example demonstrates an increased acceleration effect by utilization of potassium acetate in a combination of a "slow" nitrogen-free polyol with a highly reactive polyol.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A cold hardening binding agent for binding particulate solid materials which is obtained by mixing a polyhydroxy compound having at least two hydroxyl groups and a polyisocyanate, characterized in that the polyhydroxy compound consists at least in part of a sufficient quantity of nitrogen basic polyol to achieve hardening of the binding agent.

2. A binding agent according to claim 1, wherein the polyol has a hydroxy number of from 100 to 1800.

3. A binding agent according to claim 2, in which the hydroxy number is from 200 to 800.

4. A binding agent according to claim 1, in which the basic polyol is multi-functional.

5. A binding agent according to claim 4, in which the basic polyol is from di- to penta-functional.

6. A binding agent according to claim 1, in which the nitrogen basic polyol is provided in admixture with a di- to penta-functional nitrogen-free polyol.

7. A binding agent according to claim 1, further including an alkali or alkaline earth metal acetate or formate to further accelerate hardening of the binding agent.

8. A binding agent according to claim 7, in which the acetate is potassium acetate.

9. A binding agent according to claim 7, in which a major proportion of the polyol is a nitrogen-free polyol.

10. A binding agent according to claim 1, further including an organo-functional silane.

11. A binding agent according to claim 1, further including a solvent.

12. A two-package composition in kit form comprising a first component consisting essentially of a hardening solution of solvent and a hardening component selected from the group consisting of a nitrogen basic polyol of hydroxy number 100–1800, a mixture of said nitrogen basic polyol and a nitrogen-free polyol, a mixture of said polyols with an alkali or alkaline earth formate or acetate, a mixture of said nitrogen basic polyol with said acetate or formate, and a mixture of said nitrogen-free polyol with said acetate or formate; and a second component comprising a di-isocyanate and sand.

* * * * *